(12) United States Patent
Anderson et al.

(10) Patent No.: US 11,454,138 B1
(45) Date of Patent: Sep. 27, 2022

(54) CARBON DIOXIDE SUBLIMATION GENERATOR

(71) Applicant: Hamilton Sundstrand Corporation, Charlotte, NC (US)

(72) Inventors: Samuel Anderson, Houston, TX (US); Julie Strickland, Houston, TX (US); Jake Rohrig, Simsbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/200,211

(22) Filed: Mar. 12, 2021

(51) Int. Cl.
*F01K 25/10* (2006.01)
*F02C 1/00* (2006.01)
*B64G 1/42* (2006.01)

(52) U.S. Cl.
CPC ............. *F01K 25/103* (2013.01); *F02C 1/00* (2013.01); *B64G 1/421* (2013.01)

(58) Field of Classification Search
CPC .......... F01K 25/103; F02C 1/00; B64G 1/421
USPC ................ 60/650, 651, 641.1, 671, 682–684
See application file for complete search history.

(56) References Cited

U.S. PATENT DOCUMENTS

| | | | |
|---|---|---|---|
| 4,431,751 A | 2/1984 | Hohlein et al. | |
| 9,416,683 B2 | 8/2016 | Murakami et al. | |
| 9,702,237 B2 | 7/2017 | Scinta et al. | |
| 10,550,737 B2 | 2/2020 | Harmon et al. | |
| 10,774,645 B1 | 9/2020 | Harmon | |
| 2007/0163822 A1* | 7/2007 | Grieve | F01D 15/02 429/415 |
| 2008/0070078 A1* | 3/2008 | Gummalla | H01M 8/0675 429/410 |
| 2008/0196208 A1 | 8/2008 | Klein | |
| 2009/0173073 A1* | 7/2009 | Guidati | F01K 23/10 60/670 |
| 2009/0205364 A1* | 8/2009 | Enis | B01D 7/02 62/604 |
| 2013/0084474 A1* | 4/2013 | Mills | H01M 10/399 429/9 |
| 2019/0170025 A1* | 6/2019 | Phelps, Sr. | F25B 9/06 |
| 2019/0323385 A1 | 10/2019 | Hammond | |
| 2021/0008464 A1 | 1/2021 | Belancik et al. | |

FOREIGN PATENT DOCUMENTS

| | | |
|---|---|---|
| DE | 102011108970 A1 | 1/2013 |
| JP | 2003126681 A | 5/2003 |
| WO | 2020147918 A1 | 7/2020 |

OTHER PUBLICATIONS

Extended European Search Report for EP Application No. 22157601.0 dated Aug. 9, 2022, pp. 1-7.

* cited by examiner

Primary Examiner — Hoang M Nguyen
(74) Attorney, Agent, or Firm — Cantor Colburn LLP

(57) ABSTRACT

A sublimation generator including a sublimation tank configured to receive ice including at least carbon dioxide. The sublimation generator also includes a first heat exchanger in thermal communication with the sublimation tank. The first heat exchanger being configured to expel heat from a coolant into the sublimation tank to sublimate the carbon dioxide into a gaseous state. The sublimation generator also includes a gas turbine generator fluidly connected to the sublimation tank and configured to receive the carbon dioxide in the gaseous state.

12 Claims, 2 Drawing Sheets

CARBON DIOXIDE SUBLIMATION GENERATOR

BACKGROUND

Figure 1:
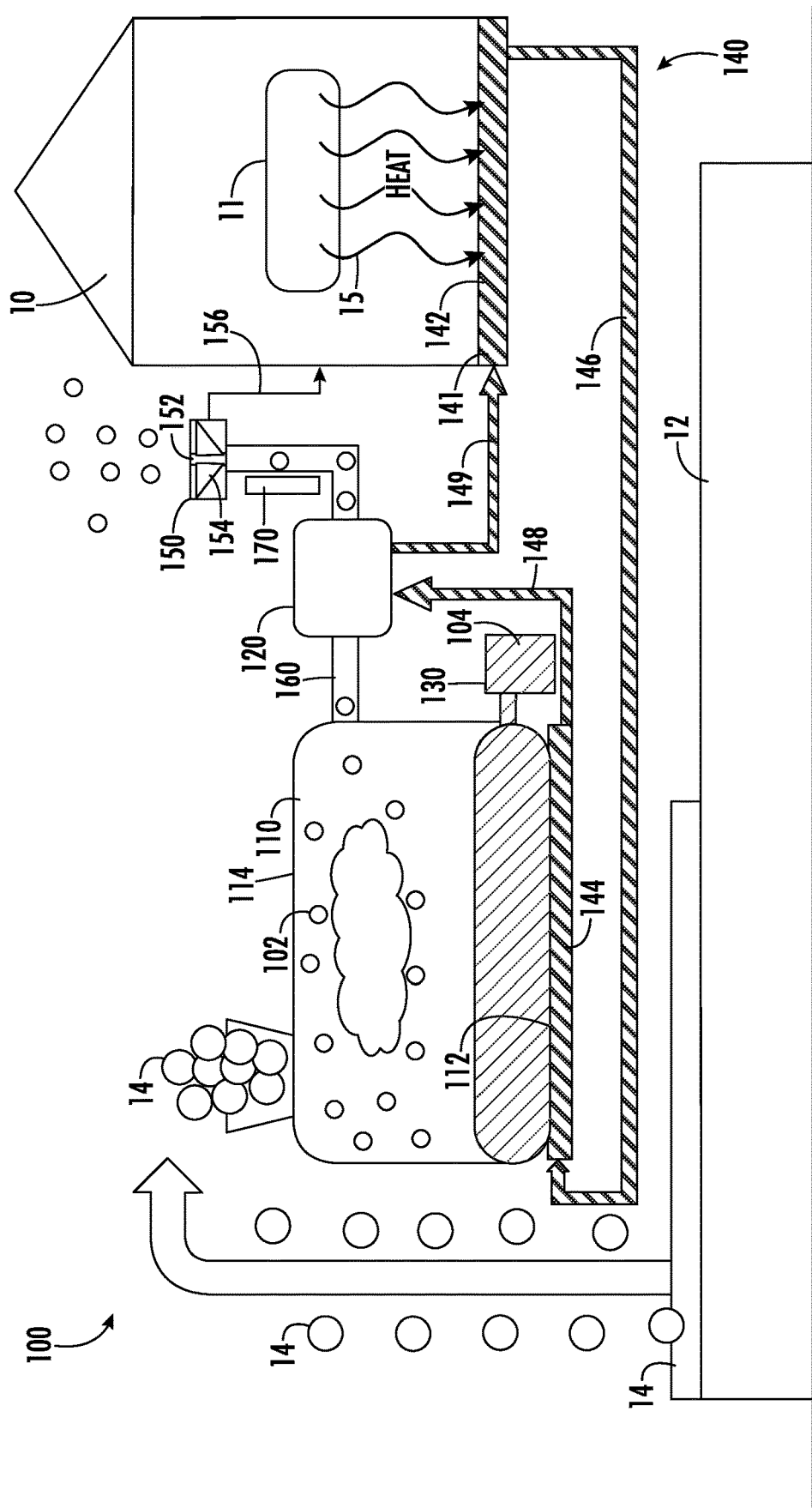

The subject matter disclosed herein relates generally to the field of electricity generation on extraplanetary environments and, specifically, to an apparatus and method for powering an electric generator using carbon dioxide.

In extraplanetary environments, such as locations on the moon, Mars, or the like, solar power may be rare or non-existent at the poles of the celestial body and, thus another method of electricity generation must be employed when solar power is reduced or unavailable.

BRIEF SUMMARY

In one embodiment, a sublimation generator is provided. The sublimation generator includes a sublimation tank configured to receive ice including at least carbon dioxide. The sublimation generator also includes a first heat exchanger in thermal communication with the sublimation tank. The first heat exchanger being configured to expel heat from a coolant into the sublimation tank to sublimate the carbon dioxide into a gaseous state. The sublimation generator also includes a gas turbine generator fluidly connected to the sublimation tank and configured to receive the carbon dioxide in the gaseous state.

In addition to one or more of the features described above, or as an alternative, further embodiments may include an electrical connection electrically connecting the gas turbine generator with the habitat, wherein the electricity generated by the gas turbine generator is provided to the habitat via the electrical connection.

In addition to one or more of the features described above, or as an alternative, further embodiments may include: a habitat, a habitat heat exchanger configured to absorb heat from the habitat, and a first coolant passageway fluidly connecting the habitat heat exchanger to the first heat exchanger. The first coolant passageway being configured to convey the coolant from the habitat heat exchanger to the first heat exchanger.

In addition to one or more of the features described above, or as an alternative, further embodiments may include a gas passageway fluidly connecting the sublimation tank and the gas turbine generator. The gas passageway being configured convey the carbon dioxide from the sublimation tank to the gas turbine generator. The sublimation generator may also include a second heat exchanger operably connected to the gas passageway and a second coolant passageway fluidly connecting the first heat exchanger to the second heat exchanger. The second coolant passageway being configured to convey the coolant from the first heat exchanger to the second heat exchanger. The second heat exchanger is in thermal communication with the carbon dioxide within the gas passageway and configured to heat the carbon dioxide within the gas passageway by expelling heat from the coolant to the carbon dioxide within the gas passageway.

In addition to one or more of the features described above, or as an alternative, further embodiments may include a third coolant passageway fluidly connecting the second heat exchanger to the habitat heat exchanger. The third coolant passageway being configured to convey the coolant from the second heat exchanger to the habitat heat exchanger.

In addition to one or more of the features described above, or as an alternative, further embodiments may include an electrical connection electrically connecting the gas turbine generator with the habitat, wherein the electricity generated by the gas turbine generator is provided to the habitat via the electrical connection.

In addition to one or more of the features described above, or as an alternative, further embodiments may include a gas passageway fluidly connecting the sublimation tank and the gas turbine generator. The gas passageway being configured convey the carbon dioxide from the sublimation tank to the gas turbine generator. The sublimation generator also includes an electrostatic precipitator operably connected to the gas passageway. The precipitator being configured to remove pollutants or regolith inadvertently collected with the ice from the carbon dioxide within the gas passageway.

In addition to one or more of the features described above, or as an alternative, further embodiments may include an electrostatic precipitator operably connected to the gas passageway. The precipitator being configured to remove pollutants or regolith inadvertently collected with the ice from the carbon dioxide within the gas passageway.

According to another embodiment, a method of generating electricity using sublimation of carbon dioxide is provided. The method includes: directing ice into a sublimation tank, the ice including at least carbon dioxide; expelling, using a first heat exchanger, heat from a coolant into the sublimation tank to sublimate the carbon dioxide into a gaseous state; and generating electricity, using a gas turbine generator, by flowing the carbon dioxide in the gaseous state through the gas turbine generator.

In addition to one or more of the features described above, or as an alternative, further embodiments may include providing the electricity generated by the gas turbine generator to the habitat via an electrical connection.

In addition to one or more of the features described above, or as an alternative, further embodiments may include absorbing heat from a habitat using a habitat heat exchanger; and flowing the coolant from the habitat heat exchanger to the first heat exchanger via a first coolant passageway.

In addition to one or more of the features described above, or as an alternative, further embodiments may include flowing the carbon dioxide from the sublimation tank to the gas turbine generator via a gas passageway; flowing the coolant from the first heat exchanger to a second heat exchanger via a second coolant passageway; and heating the carbon dioxide within the gas passageway by expelling heat from the coolant to the carbon dioxide within the gas passageway using the second heat exchanger.

In addition to one or more of the features described above, or as an alternative, further embodiments may include flowing the coolant from the second heat exchanger to the habitat heat exchanger via a third coolant passageway In addition to one or more of the features described above, or as an alternative, further embodiments may include providing the electricity generated by the gas turbine generator to the habitat via an electrical connection.

In addition to one or more of the features described above, or as an alternative, further embodiments may include flowing the carbon dioxide from the sublimation tank to the gas turbine generator via a gas passageway; and removing pollutants or regolith inadvertently collected with the ice from the carbon dioxide within the gas passageway using an electrostatic precipitator.

In addition to one or more of the features described above, or as an alternative, further embodiments may include removing pollutants from the carbon dioxide within the gas passageway using an electrostatic precipitator.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

Figure 2:
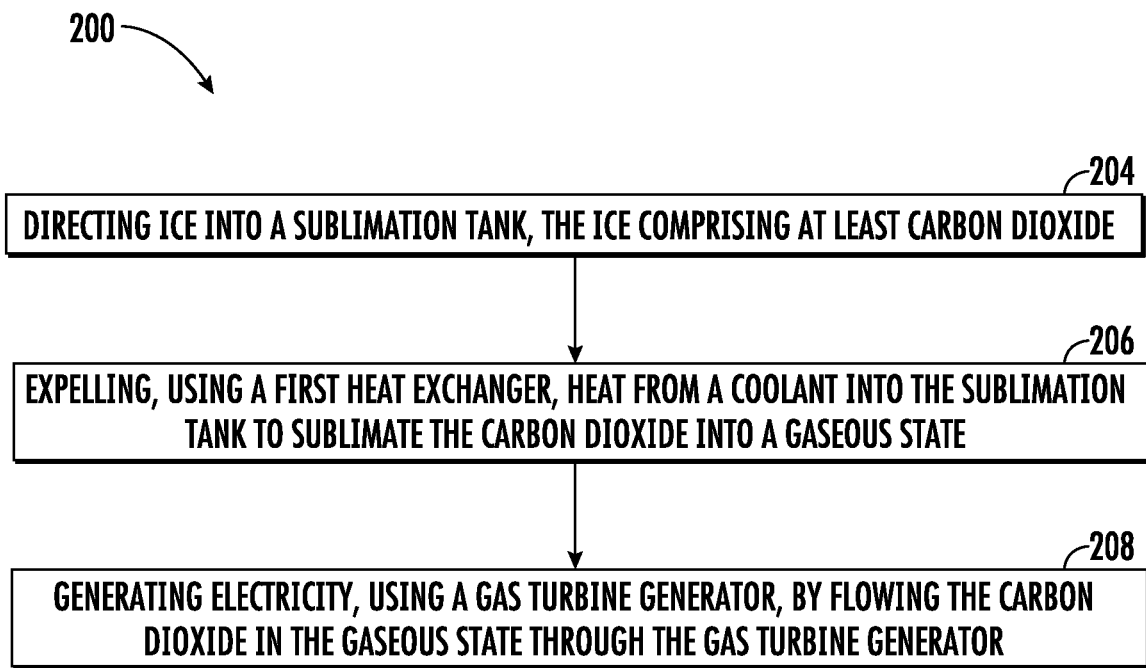

The following descriptions should not be considered limiting in any way. With reference to the accompanying drawings, like elements are numbered alike:

FIG. 1 illustrates a schematic view of an extraplanetary habitat and sublimation generator, according to an embodiment of the present disclosure; and FIG. 2 illustrates a flow chart of a method of generating electricity using sublimation of carbon dioxide, in accordance with an embodiment of the present disclosure.

DETAILED DESCRIPTION

A detailed description of one or more embodiments of the disclosed apparatus and method are presented herein by way of exemplification and not limitation with reference to the Figures.

In extraplanetary environments, such as locations on a moon, a planet, an asteroid, or the like, heat is generated by equipment such as electronics which must be dissipated, and/or it is desired to provide climate control to a habitat. The atmosphere (air) may be thin or non-existent, so traditional methods of heat transfer cannot be utilized. Thus, a thermal energy exchange apparatus must be provided. Further, in said extraplanetary environments, solar power may be rare or non-existent at the poles of the celestial body and, thus, other methods of electricity generation must be employed when solar power is unavailable or to supplement solar power. Embodiments disclosed herein utilize the heat that is generated by the habitats to melt ice on the celestial body and sublimate carbon dioxide to power a generator.

Referring now to FIG. 1, illustrated is a schematic view of an extraplanetary habitat 10 and a sublimation generator 100. The extraplanetary habitat 10 may be located on a celestial or extraterrestrial location 12, such as, for example, a moon, an asteroid, or another planet. The extraplanetary habitat 10 may be a facility where humans work or live, or a non-human occupied facility. In some non-limiting examples, a non-human occupied facility may be occupied by plants, robots, or animals. In some non-limiting examples, a non-human occupied facility may be used for storage, manufacturing, or power generation.

The habitat 10 is located proximate ice 14 on the extraterrestrial location 12. The habitat 10 includes one or more devices 11 that generate heat 15 and which are desired to be cooled. For example, the habitat 10 may include an environmental control and life support system (ECLSS) and/or a thermal control system or other components such as electronics or the like which generate heat through operation.

The extraterrestrial location 12 includes ice 14. The ice 14 may be harvested and provided to a sublimation tank 110 of the sublimation generator 100. The sublimation tank 110 is configured to receive the ice 14. The sublimation tank 110 is in thermal communication with a first heat exchanger 144. The first heat exchanger 144 may be a liquid-to-solid heat exchanger. The sublimation generator 100 is configured to utilize heat from the habitat 10 to heat up ice 14 and sublimate carbon dioxide 102 stored within the ice 14. Sublimation may be defined as transitioning from a solid state to a gas state.

The heat 15 from the habitat 10 may be conveyed using a coolant circuit 140 that is configured to utilize a coolant 141 to absorb heat from the habitat 10 and reject the heat into sublimation tank 110. The coolant circuit 140 is composed of a habitat heat exchanger 142, a first heat exchanger 144, a first coolant passageway 146 fluidly connecting the habitat heat exchanger 142 to the first heat exchanger 144, a second heat exchanger 120, a second coolant passageway 148 fluidly connecting the first heat exchanger 144 to the second heat exchanger 120, and a third coolant passageway 149 fluidly connecting the second heat exchanger 120 to the habitat heat exchanger 142.

The first coolant passageway 146 may be a tube, pipe, hose, or other conduit configured to convey the coolant 141 from the habitat heat exchanger 142 to the first heat exchanger 144. The second coolant passageway 148 may be a tube, pipe, hose, or other conduit configured to convey the coolant 141 from the first heat exchanger 144 to the second heat exchanger 120. The third coolant passageway 149 may be a tube, pipe, hose, or other conduit configured to convey the coolant 141 from the second heat exchanger 120 to the habitat heat exchanger 142.

The second heat exchanger 120 may be a liquid-to-gas heat exchanger. The second heat exchanger 120 is optional and may be removed from the sublimation generator 100, which would also remove the third coolant passageway 149. In this case, the second coolant passageway 148 would then fluidly connect the first heat exchanger 144 to the habitat heat exchanger 142.

The habitat heat exchanger 142 is configured to absorb heat 15 from the habitat 10 into the coolant 141. The first heat exchanger 144 is configured to expel or reject heat from the coolant 141 into the sublimation tank 110. The heat expelled into the sublimation tank 110 heats up the ice 14. The ice 14 is composed of at least carbon dioxide 102. The ice 14 may also include water 104. The ice 14 may be formed of the carbon dioxide 102 and no water 104. The ice 14 may have been formed through atmospheric or geological processes. For example, carbon dioxide 102 is abundant in the air on Mars and cold temperatures can result in the carbon dioxide 102 condensing into dry ice clouds and/or snow, which then may form dry ice sheets on the surface of Mars.

When the ice 14 is heated by the heat from the first heat exchanger 144, the water 104 in the ice 14 melts into liquid form and the carbon dioxide 102 in the ice 14 sublimates into a gaseous state. The water 104 is diverted into a water tank 130 where it may be collected and stored or used promptly. The water 104 may be utilized for a variety of different purposes including, but not limited to, electrolysis, cleaning, cooking, drinking, hydroponics, irrigation, fuel cells, or any other purposes known to one of skill in the art. The water tank 130 may be fluidly connected to the sublimation tank 110 at or proximate a bottom 112 of the sublimation tank 110. The bottom 112 of the sublimation tank 110 is located opposite a top 114 of the sublimation tank 110.

The carbon dioxide 102 in the gaseous state is directed to a gas turbine generator 150. The gas turbine generator 150 is fluidly connected to the sublimation tank 110 and configured to receive the carbon dioxide 102 in the gaseous state. The gas turbine generator 150 may be fluidly connected to the sublimation tank 110 via a gas passageway 160. The gas passageway 160 may be a tube, pipe, hose, or other conduit configured convey the carbon dioxide 102 from the sublimation tank 110 to the gas turbine generator 150. The gas passageway 160 may be fluidly connected to the sublimation tank 110 at or proximate the top 114 of the sublimation tank 110. The gas turbine generator 150 may include one or more turbine blades 154 operably connected to a generator armature 152. The carbon dioxide 102 is configured to rotate the one or more turbine blades 154 as the carbon dioxide 102 passes through the gas turbine generator 150. The rotation of the one or more turbine blades 154 is configured to rotate the generator armature 152 to generate electricity. It is understood that although a particular gas turbine generator 150 having blades 154 and the generator armature 152 is described herein, it is understood that the embodiments disclosed herein may be applicable to any other gas turbine generator.

The electricity may be provided to the habitat 10 to help power the habitat 10. The gas turbine generator 150 may be electrically connected to the habitat 10 by an electrical connection 156.

The second heat exchanger 120 may be operably connected to the gas passageway 160. The second heat exchanger 120 may be in thermal communication with the carbon dioxide 102 within the gas passageway 160 and configured to heat the carbon dioxide 102 within the gas passageway 160 by expelling or rejecting heat from the coolant 141 to the carbon dioxide 102 within the gas passageway 160. The second heat exchanger 120 heats the carbon dioxide 102 and increases the pressure of the carbon dioxide 102 via expansion, which improves the efficiency and/or output of the gas turbine generator 150.

The sublimation generator 100 may also include an electrostatic precipitator 170 operably connected to the gas passageway 160. The electrostatic precipitator 170 is configured to remove pollutants or regolith inadvertently collected with the ice 14 from the carbon dioxide 102 within the gas passageway 160. Pollutants may include soot, any other known pollutant that may have froze with the water 104 and the carbon dioxide 102 within the ice 14 or any other known pollutant that may have been collected with the ice 14. The electrostatic precipitator 170 is configured to negatively charge particles in the carbon dioxide 102 and then use a positively charged plate (not shown for simplicity) to attract the negatively charged particles in the carbon dioxide 102.

Advantageously, the electrostatic precipitator 170 helps maintain the cleanliness of the gas turbine generator 150 by collecting pollutants prior to the gas turbine generator 150, thus helping to ensure that the gas turbine generator 150 continues to operate properly. Also advantageously, the electrostatic precipitator 170 helps reduce pollution in the atmosphere of the extraterrestrial location 12.

Referring now to FIG. 2, with continued reference to FIG. 1, a flow chart of method 200 of generating electricity using sublimation of carbon dioxide 102 is illustrated, in accordance with an embodiment of the disclosure.

At block 204, ice 14 is directed into a sublimation tank 110. The ice 14 comprising at least carbon dioxide 102. The ice 14 may additionally comprise water 104.

At block 206, a first heat exchanger 144 expels heat from a coolant 141 into the sublimation tank 110 sublimate the carbon dioxide 102 into a gaseous state. The heat may also melt the ice 14 into water 104 if the ice contains water 104.

At block 208, a gas turbine generator 150 generates electricity by flowing the carbon dioxide 102 in the gaseous state through the gas turbine generator 150.

Block 206 of the method 200 may also include that heat is absorbed from a habitat 10 using a habitat heat exchanger 142 and the coolant 141 is flowed from the habitat heat exchanger 142 to the first heat exchanger 144 via a first coolant passageway 146.

Block 208 of the method 200 may also include that the carbon dioxide 102 is flowed from the sublimation tank 110 to the gas turbine generator 150 via a gas passageway 160, the coolant 141 is flowed from the first heat exchanger 144 to a second heat exchanger 120 via a second coolant passageway 148, and the carbon dioxide 102 is heated within the gas passageway 160 by expelling heat from the coolant 141 to the carbon dioxide 102 within the gas passageway 160 using a second heat exchanger 120.

Block 206 of the method 200 may also include that the coolant 141 is flowed from the second heat exchanger 120 to the habitat heat exchanger 142 via a third coolant passageway 149.

Block 208 of the method 200 may further include that electricity generated by the gas turbine generator 150 is provided to the habitat 10 via an electrical connection 156.

Block 208 of the method 200 may yet further include that pollutants are removed from the carbon dioxide 102 within the gas passageway 160 using an electrostatic precipitator 170.

Technical effects and benefits of the features described herein include sublimating frozen carbon dioxide using heat from a habitat and using the expansion of the carbon dioxide into a gaseous state with an optional subsequent second stage heating to rotate a gas turbine generator and generate electricity.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A sublimation generator, comprising:
   a sublimation tank configured to receive ice, the ice comprising at least carbon dioxide;

a first heat exchanger in thermal communication with the sublimation tank, the first heat exchanger being configured to expel heat from a coolant into the sublimation tank to sublimate the carbon dioxide into a gaseous state;

a gas turbine generator fluidly connected to the sublimation tank and configured to receive the carbon dioxide in the gaseous state;

a habitat;

a habitat heat exchanger configured to absorb heat from the habitat;

a first coolant passageway fluidly connecting the habitat heat exchanger to the first heat exchanger, the first coolant passageway being configured to convey the coolant from the habitat heat exchanger to the first heat exchanger;

a gas passageway fluidly connecting the sublimation tank and the gas turbine generator, the gas passageway being configured convey the carbon dioxide from the sublimation tank to the gas turbine generator, a second heat exchanger operably connected to the gas passageway, and a second coolant passageway fluidly connecting the first heat exchanger to the second heat exchanger, the second coolant passageway being configured to convey the coolant from the first heat exchanger to the second heat exchanger, wherein the second heat exchanger is in the thermal communication with the carbon dioxide within the gas passageway and configured to heat the carbon dioxide within the gas passageway by expelling heat from the coolant to the carbon dioxide within the gas passageway.

2. The sublimation generator of claim 1, further comprising:

an electrical connection electrically connecting the gas turbine generator with the habitat, wherein electricity generated by the gas turbine generator is provided to the habitat via the electrical connection.

3. The sublimation generator of claim 1, further comprising:

a third coolant passageway fluidly connecting the second heat exchanger to the habitat heat exchanger, the third coolant passageway being configured to convey the coolant from the second heat exchanger to the habitat heat exchanger.

4. The sublimation generator of claim 3, further comprising:

an electrical connection electrically connecting the gas turbine generator with the habitat, wherein the electricity generated by the gas turbine generator is provided to the habitat via the electrical connection.

5. The sublimation generator of claim 1, further comprising:

a gas passageway fluidly connecting the sublimation tank and the gas turbine generator, the gas passageway being configured convey the carbon dioxide from the sublimation tank to the gas turbine generator; and an electrostatic precipitator operably connected to the gas passageway, the precipitator being configured to remove pollutants or regolith inadvertently collected with the ice from the carbon dioxide within the gas passageway.

6. The sublimation generator of claim 1, further comprising:

an electrostatic precipitator operably connected to the gas passageway, the precipitator being configured to remove pollutants or regolith inadvertently collected with the ice from the carbon dioxide within the gas passageway.

7. A method of generating electricity using sublimation of carbon dioxide, comprising:

directing ice into a sublimation tank, the ice comprising at least carbon dioxide;

expelling, using a first heat exchanger, heat from a coolant into the sublimation tank to sublimate the carbon dioxide into a gaseous state;

generating electricity, using a gas turbine generator, by flowing the carbon dioxide in the gaseous state through the gas turbine generator;

absorbing heat from a habitat using a habitat heat exchanger;

flowing the coolant from the habitat heat exchanger to the first heat exchanger via a first coolant passageway;

flowing the carbon dioxide from the sublimation tank to the gas turbine generator via a gas passageway, flowing the coolant from the first heat exchanger to a second heat exchanger via a second coolant passageway; and heating the carbon dioxide within the gas passageway be expelling heat from the coolant to the carbon dioxide within the gas passageway using the second heat exchanger.

8. The method of claim 7, further comprising:
providing the electricity generated by the gas turbine generator to the habitat via an electrical connection.

9. The method of claim 7, further comprising:
flowing the coolant from the second heat exchanger to the habitat heat exchanger via a third coolant passageway.

10. The method of claim 9, further comprising:
providing the electricity generated by the gas turbine generator to the habitat via an electrical connection.

11. The method of claim 7, further comprising:
flowing the carbon dioxide from the sublimation tank to the gas turbine generator via a gas passageway; and
removing pollutants or regolith inadvertently collected with the ice from the carbon dioxide within the gas passageway using an electrostatic precipitator.

12. The method of claim 7, further comprising:
removing pollutants from the carbon dioxide within the gas passageway using an electrostatic precipitator.

* * * * *